(12) United States Patent
Elliott

(10) Patent No.: US 8,905,321 B2
(45) Date of Patent: Dec. 9, 2014

(54) SYSTEM FOR SUPPLYING HEAT TO CONSTRUCTION EQUIPMENT CAB

(75) Inventor: Timothy F. Elliott, Chambersburg, PA (US)

(73) Assignee: Manitowoc Crane Companies, LLC, Manitowoc, WI (US)

(*) Notice: Subject to any disclaimer, the term of this patent is extended or adjusted under 35 U.S.C. 154(b) by 1652 days.

(21) Appl. No.: 12/417,256

(22) Filed: Apr. 2, 2009

(65) Prior Publication Data

US 2010/0252644 A1 Oct. 7, 2010

(51) Int. Cl.
| | |
|---|---|
| F24D 5/00 | (2006.01) |
| F24D 19/10 | (2006.01) |
| B60H 3/00 | (2006.01) |
| B60H 1/00 | (2006.01) |
| B60H 1/22 | (2006.01) |
| B60H 1/03 | (2006.01) |
| B66C 13/54 | (2006.01) |
| B66F 9/22 | (2006.01) |

(52) U.S. Cl.
CPC .............. *B60H 1/00378* (2013.01); *B60H 1/22* (2013.01); *B60H 1/03* (2013.01); *B66C 13/54* (2013.01); *B66F 9/22* (2013.01)
USPC ............................................. 237/2 R; 165/43

(58) Field of Classification Search
USPC ...................... 454/152, 76, 108, 155; 237/2 R
See application file for complete search history.

(56) References Cited

U.S. PATENT DOCUMENTS

| | | | |
|---|---|---|---|
| 4,192,456 A * | 3/1980 | Shields et al. | ........... 237/12.3 R |
| 4,197,712 A | 4/1980 | Zwick et al. | |
| 4,286,551 A | 9/1981 | Blitz | |
| 4,352,456 A | 10/1982 | Brandenburg, Jr. | |
| 4,373,869 A | 2/1983 | Martin et al. | |
| 4,401,009 A | 8/1983 | Zeuner et al. | |
| 4,432,493 A | 2/1984 | Moser et al. | |
| 4,972,762 A | 11/1990 | Kubik | |
| 5,024,377 A | 6/1991 | Harrison | |
| 5,085,269 A | 2/1992 | Aoki | |
| 5,318,100 A * | 6/1994 | Aoki | .............................. 165/202 |
| 5,927,072 A * | 7/1999 | Vannette | .......................... 60/452 |
| 5,954,266 A | 9/1999 | Hoshino et al. | |

(Continued)

FOREIGN PATENT DOCUMENTS

| | | |
|---|---|---|
| CN | 1319716 A | 10/2001 |
| CN | 1993242 A | 7/2007 |

(Continued)

*Primary Examiner* — Dana Ross
*Assistant Examiner* — Thomas Ward
(74) *Attorney, Agent, or Firm* — Brinks Gilson & Lione; Craig Buschmann

(57) ABSTRACT

An apparatus is provided that quickly elevates and maintain a construction equipment engine coolant to operating temperature in order to lower the dwell time for the operator's cab to reach a comfortable temperature level during a period when the engine is in idle and main crane functions are not operated. The apparatus includes an auxiliary hydraulic circuit for rapidly bringing engine coolant temperature up to operating temperature. Engine coolant operating temperature is achieved by inducing a hydraulic load to the engine. By inducing a hydraulic load, a horsepower load is exerted on the engine causing the engine to generate heat sufficient to raise the engine coolant to operating temperature for heating the cabin. A pressure reducing relieving valve and a pilot operated relief valve result in precise hydraulic horsepower load to the construction equipment engine. Operation of the pilot operated relief valve also warms hydraulic fluid for a hydraulic reservoir.

22 Claims, 2 Drawing Sheets

(56) References Cited

U.S. PATENT DOCUMENTS

| | | |
|---|---|---|
| 6,269,635 B1 | 8/2001 | Zuehlke |
| 7,089,733 B1 | 8/2006 | Jackson et al. |
| 2006/0283174 A1* | 12/2006 | Leone et al. ............ 60/285 |
| 2007/0277783 A1* | 12/2007 | Gibson ................. 123/446 |

FOREIGN PATENT DOCUMENTS

| | | |
|---|---|---|
| DE | 35 06 040 A1 | 9/1985 |
| DE | 197 46 330 | 4/1998 |
| EP | 0 543 606 A1 | 5/1993 |
| JP | S64-3244 | 1/1989 |
| JP | H06-824 | 1/1994 |
| JP | H07-33929 | 8/1995 |
| JP | H10-24721 | 1/1998 |
| JP | H10-119552 | 5/1998 |
| JP | 2004-268752 | 9/2004 |
| JP | 2004-308746 | 11/2004 |
| JP | 2004-330869 | 11/2004 |
| JP | 2008-144640 A | 6/2008 |
| RU | 2022814 C1 | 11/1994 |
| SU | 1393657 A1 | 5/1988 |

* cited by examiner

SYSTEM FOR SUPPLYING HEAT TO CONSTRUCTION EQUIPMENT CAB

BACKGROUND

1. Field of the Invention

The application is directed to a heating system for an operator cab in mobile hydraulically operated construction equipment, where the engine coolant circuit provides heat to the operator's cab. In particular, the application is directed to an auxiliary hydraulic circuit that rapidly warms the operator cab in an idle period when main crane functions are not being operated.

2. Background Art

Heavy construction equipment, such as a mobile hydraulic crane, for outdoor use are provided as a superstructure unit having an engine and a cab on a common platform, or a carrier unit having an engine and a superstructure unit having the cab. In the later case, the superstructure unit is usually rotatable upon the carrier unit. In either configuration, the superstructure unit consists of the hydraulic crane. Also, depending on the configuration, either the carrier unit or the superstructure unit may include a pair of crawlers or axles and tires.

The cab is an enclosed area where an operator can control the crane. The operator's cab is heated using a heater located in an engine coolant circuit.

The power system for the crane is hydraulic. In the hydraulic system, an engine powers a hydraulic pump that in turn drives an actuator (such as a motor or cylinder) associated with various mechanical subsystems. The actuators translate hydraulic pressure forces to mechanical forces thereby imparting movement to the mechanical subsystems of the crane.

The hydraulic system can be one of two types—open loop and closed loop. Most hydraulic cranes primarily use an open loop hydraulic system. In an open loop system, hydraulic fluid is pumped (under high pressure provided by the pump) to the actuator. After the hydraulic fluid is used in the actuator, it flows back to a reservoir before it is recycled by the pump. The loop is considered "open" because the reservoir intervenes on the fluid return path from the actuator before it is recycled by the pump. An open loop system having a single pump maintains pressure sufficient to drive the fully loaded mechanical subsystems. An efficient type of open loop system is a load sensing, open loop system.

In conventional heavy construction equipment for outdoor use, when the engine is started then idled for an extended period of time, the engine coolant will be below a temperature necessary to heat the operator's cab. Subsequently, for operation in cold climates, typically auxiliary heaters fueled by propane or diesel fuel are used to provide heat to the cab. Some conventional heavy construction equipment heat the cab using heat generated from operation of the hydraulic equipment. However, propane or diesel fueled heaters pose safety hazards, and hydraulic heaters are large, inefficient and expensive. Also, heating systems that obtain heat from the hydraulic system are complex.

Prior art examples that disclose heating the cab directly from the hydraulic circuit are provided in U.S. Pat. Nos. 5,318,100; 5,085,269; 4,352,456; 4,432,493; 4,192,456. Another prior art example, U.S. Pat. No. 5,024,377, provides heat from an automatic transmission. A further prior art example, U.S. Pat. No. 5,085,269, provides heat by a dedicated heat pump.

However, none of the prior art examples provide heat to a cab during periods when the construction equipment engine is in idle and main crane functions are not being operated, and without stand-alone propane or diesel heaters.

BRIEF SUMMARY

The present invention provides an auxiliary hydraulic circuit for rapidly bringing engine coolant temperature up to operating temperature after the engine is started but is idled for periods when main crane functions are not operated. Heat is provided to the operator's cab by a heater in the engine coolant loop and hydraulic fluid in the hydraulic reservoir is warmed.

An aspect of the invention is to quickly elevate and maintain the construction equipment engine coolant to operating temperature in order to lower the dwell time for the operator's cab to reach a comfortable temperature level during a period when the engine is in idle and main crane functions are not operated.

An aspect of the invention is achieving engine coolant operating temperature by inducing a hydraulic load to the engine. By inducing a hydraulic load, a horsepower load is exerted on the engine causing the engine to generate heat sufficient to raise the engine coolant to operating temperature for providing heat by way of the heater for heating the cabin.

A further aspect of the invention is inducing hydraulic load by controlling the hydraulic fluid to enter a warm-up circuit. Subsequently, a secondary benefit of the present invention is maintaining the hydraulic fluid at a temperature appropriate for operation of the hydraulic system.

A further aspect of the invention is a pressure reducing relieving valve and a pilot operated relief valve that provide consistent repeatable circuit flow and pressure. Conventional hydraulic circuits contain fixed or adjustable orifices that are viscosity- and temperature-sensitive. The pressure reducing relieving valve and pilot operated relief valve result in precise hydraulic horsepower load to the construction equipment engine.

A further aspect of the invention is a proportional control solenoid valve that delivers a ramp-up delivery of hydraulic fluid flow. Hydraulic load is induced to create horsepower load on the engine in a manner that does not cause the engine to stall during cold temperature start-up.

A further aspect of the invention is a control unit that stops current to the control solenoid when engine coolant temperature reaches operating temperature, or when the hydraulic reservoir reaches its maximum temperature limit. The engine coolant temperature can be increased while the hydraulic functions are not being operated, but without overheating the hydraulic fluid contained in the reservoir.

These and other aspects of the invention are described in detail with respect to the drawings.

DETAILED DESCRIPTION

Figure 1:
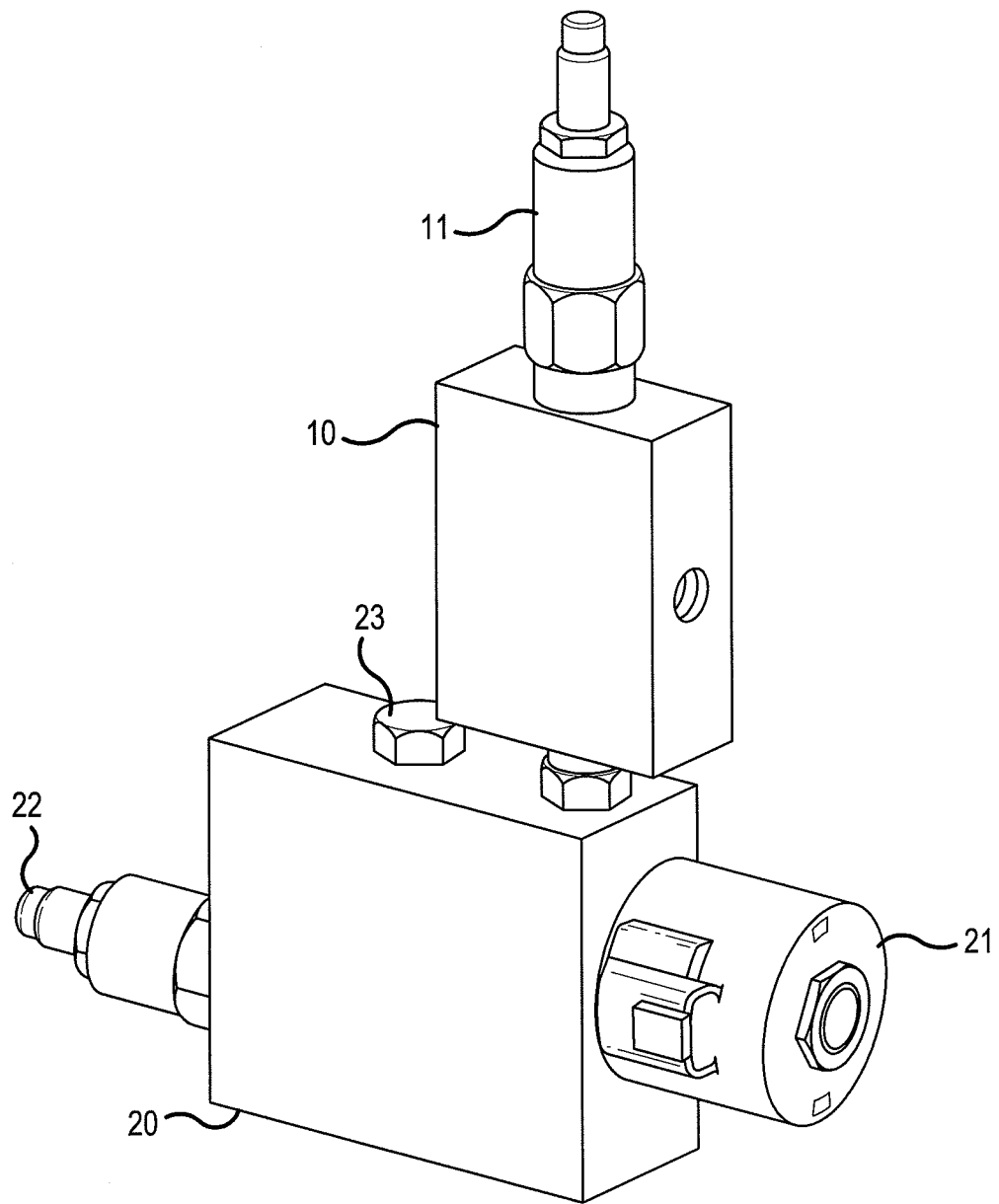
FIG. 1 is a diagram of manifolds and associated valves for an auxiliary hydraulic circuit according to the invention.

An exemplary embodiment of the auxiliary hydraulic circuit 40 of the present invention consists of two manifolds hard plumbed together. A diagram showing the two manifolds and associated components is provided in FIG. 1. A schematic of the auxiliary hydraulic circuit is shown in FIG. 2.

Figure 2:
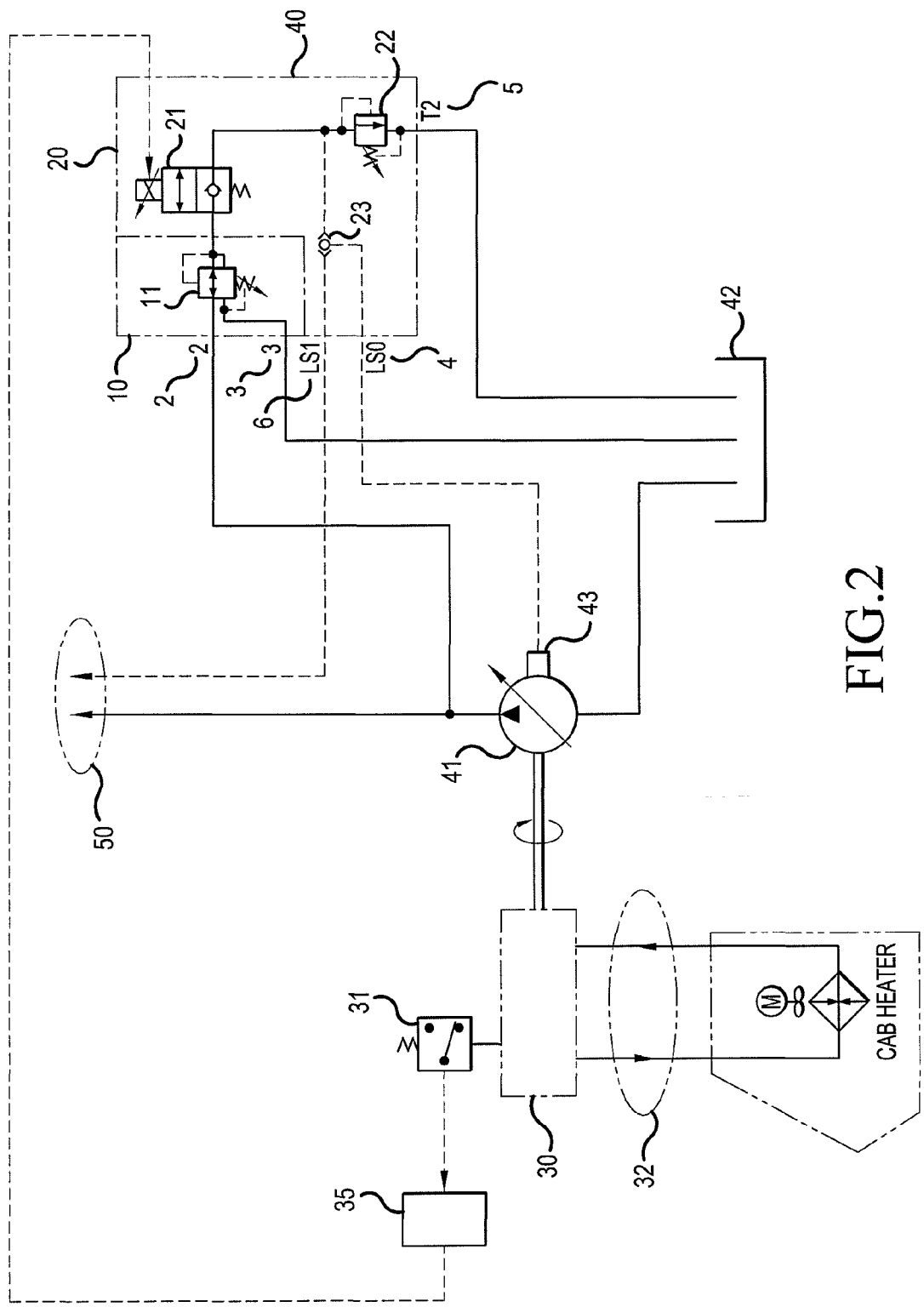
FIG. 2 is a schematic of an auxiliary hydraulic circuit according to an embodiment of the invention.

In the exemplary embodiment of the present invention, as shown in FIG. 2, a diesel engine 30 drives a load sense piston pump 41 to produce the 4000 psi hydraulic pressure necessary for actuators of the main crane functions 50. During periods of engine idle, there may be extended periods when main crane functions are not normally operated. When an engine is started, and during periods of engine idle and the main crane functions are not operated, engine coolant temperature may be below operating temperature of 180 degrees.

The present invention provides an auxiliary hydraulic circuit that produces a flow of, i.e., 8 GPM at a pressure of 2600 PSI, that causes a required 12 horsepower load on the engine 30 in driving the piston pump 41. The auxiliary hydraulic circuit includes a hydraulic fluid reservoir 42 that receives hydraulic fluid that has been warmed by the circuit. When hydraulic fluid is needed for main crane functions, the warmed hydraulic fluid from the reservoir 42 can be used with little or no warm-up required.

The first, or inlet manifold 10 contains (1) pressure reducing relieving valve 11 that limits both inlet and downstream pressure to its set point of 3500 PSI which is a preferred maximum circuit pressure that protects the entire manifold from over-pressurization. The inlet manifold 10 is preferably made of ductile iron construction due to the inlet port 2 being plumbed in parallel with the main craning functions that operate at 4000 PSI. The second manifold 20 contains a proportional 2 position-2 way control solenoid valve 21 to turn the circuit on and off, as well as to provide a ten second ramp-up flow output. Second manifold 20 also includes an adjustable pilot operated relief valve 22 to smoothly and consistently transition from open to close position to generate and maintain the required circuit pressure of 2600 psi, as well as heat the hydraulic fluid, and a load sense shuttle check valve 23 to send a load sense pressure signal to the pump control for either the auxiliary hydraulic circuit or the main crane function circuits. This manifold 20 can be constructed of cost effective aluminum because it is subject only to the circuit pressure of 2600 PSI.

The flow of hydraulic fluid in auxiliary hydraulic circuit is produced by the load sense piston pump 41 drawing from a hydraulic reservoir 42. The load sense piston pump 41 is driven by a diesel engine 30, and places the horsepower load on the engine 30. Load on the engine 30 in turn generates heat that heats the engine coolant. The heated engine coolant is circulated in a coolant loop 32 on the engine block. The coolant loop 32 preferably contains a radiation-type cab heater 33 for heating the cab. An engine coolant temperature switch 31 located in the coolant loop 32 of the engine block senses engine coolant temperature. An electronic control unit (ECU) module 35 regulates the auxiliary hydraulic circuit based on a signal from the engine temperature switch 31 and based on the operation mode of main crane functions.

The auxiliary hydraulic circuit begins operation after the engine has reached a stable idle RPM. The temperature switch 31 senses the engine coolant temperature and, for example, detects if a 180° F. coolant temperature is maintained. The proportional coil of the control solenoid valve 21 is signaled to energize and shift the control solenoid valve 21 to the ON position by the temperature switch 31. When coolant temperature drops below 180° F., a signal is sent to an input of the crane's electrical system ECU module 35 that conditions the signal to deliver a ten second proportional ramp-up output that begins driving the load sense piston pump 41 and opens the control solenoid 21 and in turn, slowly delivers fluid flow to the relief valve 22. This proportional ramp-up allows the engine to properly fuel and not stall during cold temperature start-up due to a sudden hydraulic load from the pump 41.

Inlet reference port 2 is connected to a parallel leg of a load sense piston pump 41 outlet that supplies the main craning functions 50. When the control solenoid 21 is signaled to open by the ECU, the piston pump 41 is signaled to stroke-up (increase flow) via port 4 and deliver hydraulic fluid to the inlet of the first inlet manifold 10 via a parallel connection of the manifolds main through flow passage to one side of the shuttle check valve 23. The hydraulic signal provided at port 4 is produced when the control solenoid 21 allows circuit flow to the relief valve 22, which creates pressure necessary to load the engine 30. The shuttle check valve 23 is connected in parallel to this pressurized connection and subsequently sends this pressure to the piston pump controller 43. The shuttle check valve 23 controls the load sense pressure signal to the piston pump 41, one direction for the crane functions 50 via port 6 and the other for the warm-up circuit 40 via port 4, with the greater of the two signals sent to the pump 41.

The circuit working pressure of 2600 PSI is generated and maintained by fluid flow across an adjustable pilot operated relief valve 22 located downstream of the control solenoid valve 21. The relief valve 22 is in a normally closed position until the proportional flow slowly generates enough up-stream pressure to open the relief valve 22 at its setting. Once open, the relief valve 22 will smoothly maintain the pressure setting.

The crane's ECU module 35 defaults the circuit to a de-energized or off position, not allowing current to the control solenoid 21 when the engine coolant reaches 180° F., when the hydraulic reservoir reaches its maximum temperature limit, or if a main crane function is selected that is supplied fluid by the load sense piston pump 41. These alternative conditions eliminate interference with craning functions and keep the reservoir 42 from being overheated.

Circuit flow of, i.e., 8 GPM is established by the additive pressure drop across the pressure reducing relieving valve 11 and the control solenoid 21 plus the relief valve 22 setting. For example, the lower the relief valve 22 is set the higher the circuit flow will be and the higher the relief valve 22 is set the lower the flow will be.

In the case where the relief valve 22 is set too high, or a down stream blockage occurs, the pressure reducing relieving valve 11 will go into relieving mode and dump the inlet flow to the hydraulic reservoir 42 via port 3 protecting the downstream components by limiting to a maximum pressure of 3500 PSI.

In the exemplary embodiment, all three components are arranged such that adequate inlet flow of 8 GPM at the pressure of 2600 PSI could be achieved to obtain the required 12 horsepower load that properly loads the engine. The subsequent hydraulic heat load generated by this work is absorbed directly into the hydraulic reservoir 42 via port 5 as a warm-up for the hydraulic fluid.

The present invention provides an auxiliary hydraulic circuit that is controlled to maintain engine coolant operating temperature during periods of engine idle. As a secondary benefit, hydraulic fluid in the hydraulic reservoir is warmed for use in the main crane functions.

By inducing a hydraulic load using the auxiliary hydraulic circuit, a horsepower load is exerted on the engine causing the engine to generate heat sufficient to raise the engine coolant to operating temperature for heating the cabin.

The present invention provides precise hydraulic horsepower load unlike conventional hydraulic circuits that contain fixed or adjustable orifices that are viscosity and temperature sensitive.

The present invention creates a horsepower load on the engine in a manner that does not cause the engine to stall during cold temperature start-up.

In the present invention, the engine coolant operating temperature is achieved while the hydraulic functions are not being operated, without overheating the hydraulic fluid contained in the reservoir.

Although the present invention has been described and illustrated with reference to the exemplary embodiment, it is clearly understood that the same is by way of illustration and example only and is not to be taken by way of limitation, the spirit and scope of the present invention being limited only by the terms of the appended claims.

I claim:

1. A crane having a drive engine, a pump driven by the drive engine, and a hydraulic system for powering main crane functions, and wherein:
   a) the drive engine is cooled by an engine coolant loop that also directs the coolant to a heat exchanger that thereby provides heat to the operator cab, and
   b) the hydraulic system includes an auxiliary hydraulic sub-system imposing a horsepower load to the drive engine, the auxiliary hydraulic sub-system comprising:
      i) at least one pressure reducing relieving valve that limits inlet pressure to the auxiliary hydraulic sub-system in order to protect the sub-system from over pressurization, the inlet pressure being the set point of the pressure reducing relieving valve, which is less than the peak pressure produced by the pump;
      ii) a coolant temperature detection switch detecting temperature of engine coolant circulated in the engine coolant loop;
      iii) a solenoid-operated control valve that turns the auxiliary hydraulic sub-system on and off;
      iv) a pilot operated relief valve that generates and maintains a pressure needed for a desired horsepower load on the drive engine; and
      v) a controller that responds to a signal from the coolant temperature detection switch indicating that the temperature of the engine coolant is below a predetermined operating temperature causing the solenoid-operated control valve to open and the pump to deliver hydraulic fluid flow to the pilot operated relief valve via the solenoid-operated control valve;
      vi) the pilot operated relief valve opening upon reaching a set pressure such that the pressure reducing relieving valve, solenoid-operated control valve and the pilot operated relief valve provide a flow rate and pressure to impose a horsepower load on the engine that brings the engine coolant temperature to the predetermined operating temperature.

2. The crane of claim 1, wherein the solenoid-operated control valve is a proportional solenoid-operated control valve, and the controller provides a signal from the coolant temperature detection switch to control the control solenoid to gradually increase delivery of hydraulic fluid flow to the pilot operated relief valve.

3. The crane of claim 1, wherein the hydraulic system includes a hydraulic reservoir providing hydraulic fluid for the pump, and wherein the temperature of the hydraulic fluid in the reservoir is monitored.

4. The crane of claim 3, wherein the controller sends a signal to the solenoid-operated control valve to switch off the auxiliary hydraulic sub-system when the engine coolant reaches the predetermined operating temperature, when the hydraulic reservoir reaches a maximum temperature limit, or when a crane function is selected for operation.

5. The crane of claim 3, wherein the pressure reducing relieving valve operates in a relieving mode to modulate and restrict inlet flow while dumping the downstream flow to the hydraulic reservoir in order to protect downstream components from excessive overpressure.

6. The crane of claim 3, wherein the hydraulic fluid in the hydraulic reservoir is warmed by the pressure reduction at the pilot operated relief valve.

7. The crane of claim 1, wherein the engine coolant is water and the predetermined operating temperature of the engine coolant is 180° F.

8. The crane of claim 1, further including a first manifold and a second manifold, wherein the solenoid-operated control valve is downstream of the pressure reducing relieving valve and attached to the second manifold.

9. The crane of claim 1, wherein the pump is a load sense piston pump, and a shuttle check valve senses load pressure and sends a load sense direction signal to the load sense piston pump, one direction for crane functions and the other direction for the auxiliary hydraulic sub-system, with the greater of the two signals sent to the pump.

10. The crane of claim 1, wherein the auxiliary hydraulic sub-system is regulated to produce a horsepower load on the drive engine that brings the engine coolant temperature to an operating temperature of at least 180° F.

11. A crane comprising a main hydraulic system and a drive engine having a coolant loop, the crane also including:
   a) an operator cab heater system including an engine coolant temperature detector and a controller wherein heat from the drive engine coolant loop is transferred through a heat exchanger and used to heat the operator cab, and
   b) an auxiliary hydraulic circuit comprising:
      i) a pressure control valve to limit the pressure in the auxiliary hydraulic circuit to a pressure lower than the pressure of the main hydraulic system; and
      ii) a relief valve downstream of the pressure control valve, the relief valve generating and maintaining a pressure in the auxiliary hydraulic circuit that provides a horsepower load to the crane engine sufficient to increase the temperature of the engine coolant in the coolant loop to a predetermined operating temperature.

12. The crane of claim 11, further including a hydraulic reservoir, wherein pressure reduction by the relief valve heats hydraulic fluid that flows to the hydraulic reservoir and wherein the temperature of the hydraulic fluid in the reservoir is monitored.

13. The crane of claim 11, wherein the operator cab heater system imposes a horsepower load necessary to bring the engine coolant to a predetermined operating temperature of at least 180° F.

14. The crane of claim 11, wherein the auxiliary hydraulic circuit further comprises a proportional solenoid-operated control downstream of the pressure control valve, the solenoid-operated control valve turning the auxiliary hydraulic circuit on and off in response to a signal from the engine coolant temperature detector, and wherein the relief valve is located downstream of the solenoid-operated control valve.

15. The crane of claim 11, wherein the auxiliary hydraulic circuit further comprises a shuttle check valve providing a load sense signal to a load sense pump, the shuttle check valve controlling the load sense pressure signal to the load sense pump to selectively operate crane functions or the auxiliary hydraulic circuit.

16. The crane of claim 11 wherein the auxiliary hydraulic circuit further comprises a first manifold and a second manifold, and the pressure control valve is mounted to the first manifold and the relief valve is mounted to the second manifold.

17. The crane of claim 1 wherein the auxiliary hydraulic sub-system also maintains the hydraulic fluid at a temperature appropriate for operation of the hydraulic system.

18. The crane of claim 11 wherein the auxiliary hydraulic sub-system also maintains the hydraulic fluid at a temperature appropriate for operation of the main hydraulic system.

19. The crane of claim 1 wherein when the controller responds to the signal from the engine coolant temperature detection switch indicating that the temperature of the engine coolant is below the predetermined operating temperature, the controller conditions the signal to deliver a ramp-up output of hydraulic fluid flow from the pump, allowing the engine to properly fuel and not stall during cold temperature start-up due to a sudden hydraulic load from the pump.

20. The crane of claim 14 wherein the controller responds to the signal from the engine coolant temperature detector indicating that the temperature of the engine coolant is below the predetermined operating temperature by providing a signal to ramp-up delivery of hydraulic fluid flow from the pump, thus allowing the engine to properly fuel and not stall during cold temperature start-up due to a sudden hydraulic load from the pump.

21. The crane of claim 11 wherein the pressure control valve comprises a pressure reducing relieving valve that provides a pressure relieving function downstream of said pressure reducing relieving valve, and the relief valve downstream of the pressure reducing relieving valve comprises a pilot operated relief valve.

22. A crane having a drive engine, a pump driven by the drive engine, and a hydraulic system for powering main crane functions, and wherein:
  a) the drive engine is cooled by an engine coolant loop that also directs the coolant to a heat exchanger that thereby provides heat to the operator cab, and
  b) the hydraulic system includes an auxiliary hydraulic sub-system imposing a horsepower load to the drive engine, the auxiliary hydraulic sub-system comprising:
    i) at least one pressure control valve that limits inlet pressure to the auxiliary hydraulic sub-system in order to protect the sub-system from over pressurization, the inlet pressure being the set point of the pressure control valve, which is less than the peak pressure produced by the pump;
    ii) a coolant temperature detection switch detecting temperature of engine coolant circulated in the engine coolant loop;
    iii) a solenoid-operated control valve that turns the auxiliary hydraulic sub-system on and off;
    iv) a relief valve that generates and maintains a pressure needed for a desired horsepower load on the drive engine; and
    v) a controller that responds to a signal from the coolant temperature detection switch indicating that the temperature of the engine coolant is below a predetermined operating temperature causing the solenoid-operated control valve to open and the pump to deliver hydraulic fluid flow to the relief valve via the solenoid-operated control valve;
    vi) the relief valve opening upon reaching a set pressure such that the pressure control valve, solenoid-operated control valve and the relief valve provide a flow rate and pressure to impose a horsepower load on the engine that brings the engine coolant temperature to the predetermined operating temperature.

* * * * *